United States Patent
Ueda et al.

(10) Patent No.: US 12,458,646 B2
(45) Date of Patent: Nov. 4, 2025

(54) THERAPEUTIC OR PREVENTING AGENT FOR MULTIPLE SCLEROSIS INCLUDING INDOLE COMPOUND

(71) Applicant: JAPAN TOBACCO INC., Tokyo (JP)

(72) Inventors: Yoshifumi Ueda, Takatsuki (JP); Takafumi Kurimoto, Takatsuki (JP); Naofumi Uesato, Takatsuki (JP)

(73) Assignee: Japan Tobacco Inc., Tokyo (JP)

( * ) Notice: Subject to any disclaimer, the term of this patent is extended or adjusted under 35 U.S.C. 154(b) by 1216 days.

(21) Appl. No.: 17/056,947

(22) PCT Filed: May 24, 2019

(86) PCT No.: PCT/JP2019/020667
§ 371 (c)(1),
(2) Date: Apr. 23, 2021

(87) PCT Pub. No.: WO2019/225740
PCT Pub. Date: Nov. 28, 2019

(65) Prior Publication Data
US 2021/0236503 A1    Aug. 5, 2021

(30) Foreign Application Priority Data
May 25, 2018 (JP) ................. 2018-100668

(51) Int. Cl.
*A61K 31/5377* (2006.01)
*A61P 25/28* (2006.01)

(52) U.S. Cl.
CPC .......... *A61K 31/5377* (2013.01); *A61P 25/28* (2018.01)

(58) Field of Classification Search
CPC ...... A61K 31/5377; A61P 25/28; A61P 25/00; C07D 403/04
See application file for complete search history.

(56) References Cited

U.S. PATENT DOCUMENTS

| | | | |
|---|---|---|---|
| 8,299,070 B2 * | 10/2012 | Inoue | .............. C07D 401/14 546/199 |
| 11,104,667 B2 | 8/2021 | Inoue et al. | |
| 2013/0116240 A1 | 5/2013 | Inoue et al. | |
| 2016/0250208 A1 | 9/2016 | Kang et al. | |
| 2017/0253577 A1 | 9/2017 | Inoue et al. | |
| 2017/0267662 A1 | 9/2017 | Inoue et al. | |
| 2018/0362506 A1 | 12/2018 | Inoue et al. | |
| 2020/0255408 A1 | 8/2020 | Inoue et al. | |
| 2021/0284627 A1 | 9/2021 | Inoue et al. | |

FOREIGN PATENT DOCUMENTS

| | | |
|---|---|---|
| CN | 104628657 A | 5/2015 |
| JP | 2007-145786 A | 6/2007 |
| WO | WO2011065402 | 6/2011 |
| WO | WO2015054612 | 4/2015 |
| WO | WO 2016002918 | 1/2016 |
| WO | WO2019225741 | 11/2019 |
| WO | WO2019225768 | 11/2019 |

OTHER PUBLICATIONS

Kidd PM. Multiple sclerosis, an autoimmune inflammatory disease: prospects for its integrative management. Altern Med Rev. Dec. 2001;6(6):540-66. (Year: 2001).*
Eleonora Tavazzi, Marco Rovaris and Loredana La Mantia CMAJ Aug. 5, 2014 186 (11) 833-840; DOI: https://doi.org/10.1503/cmaj.130727 (Year: 2014).*
Bouërat, L.; Fensholdt, J.; Liang, X. F.; Havez, S.; Nielsen, S. F.; Hansen, J. R.; Bolvig, S.; Andersson, C. J. Med. Chem.2005, 48, 5412-5414. (Year: 2005).*
Kannan et al., "Itk Signals Promote Neuroinflammation by Regulating CD4+ T-Cell Activation and Trafficking", The Journal of Neuroscience, Jan. 2015, 35(1):221-233.
PCT International Search Report in International Appln. No. PCT/JP2019/020667, dated Jul. 16, 2019, 4 pages, English translation.
McCarthy et al. (2012) "Mouse Models of Multiple Sclerosis: Experimental Autoimmune Encephalomyelitis and Theiler's Virus-Induced Demyelinating Disease" Methods Mol Biol. 900:381-401.

* cited by examiner

*Primary Examiner* — Danah Al-Awadi
*Assistant Examiner* — Chantal Adlam
(74) *Attorney, Agent, or Firm* — Fish & Richardson P.C.

(57) ABSTRACT

The present invention provides a therapeutic agent or prophylactic agent for multiple sclerosis, containing N-[2-(6,6-dimethyl-4,5,6,7-tetrahydro-1H-indazol-3-yl)-1H-indol-6-yl]-N-methyl-(2S)-2-(morpholin-4-yl)propanamide or a pharmaceutically acceptable salt thereof.

6 Claims, 2 Drawing Sheets

THERAPEUTIC OR PREVENTING AGENT FOR MULTIPLE SCLEROSIS INCLUDING INDOLE COMPOUND

CROSS-REFERENCE TO RELATED APPLICATIONS

This application is the U.S. National Stage of International Application No. PCT/JP2019/020667, filed on May 24, 2019, which claims the benefit of Japanese Application No. 2018-100668, filed on May 25, 2018. The contents of each of these applications are incorporated herein by reference in their entirety.

TECHNICAL FIELD

The present invention relates to a novel pharmaceutical use of N-[2-(6,6-dimethyl-4,5,6,7-tetrahydro-1H-indazol-3-yl)-1H-indol-6-yl]-N-methyl-(2S)-2-(morpholin-4-yl)propanamide (hereinafter to be referred to as Compound A) or a pharmaceutically acceptable salt thereof. More particularly, the present invention relates to a therapeutic agent or prophylactic agent for multiple sclerosis, an agent for preventing the recurrence of multiple sclerosis, and an agent for suppressing the progression of physical disorders of multiple sclerosis, each containing Compound A or a pharmaceutically acceptable salt thereof.

BACKGROUND ART

Multiple sclerosis (MS) is an inflammatory demyelinating disease of the central nervous system that accompanies repeated relapses and remissions, and is characterized by temporal and spatial multiplicity of inflammatory demyelinating lesions. Demyelination can cause a wide range of disorders in pyramidal tract, cerebellum, brain stem, sensation, bladder, rectum, visual and mental function, where symptoms and severity vary depending on the site and extent of demyelination. The main findings are feeling of weakness, ataxia and sensory neuropathy, and symptoms such as urination and defecation disorders, mental and memory disorders may be expressed as the pathology progresses (non-patent document 1).

MS is classified into the following three disease types based on the clinical course (non-patent document 2). In relapsing-remitting MS (RRMS), acute exacerbation (recurrence) and subsequent remission are repeated. Primary progressive MS (PPMS) is a progressive MS that does not show a clear recurrence from the early stages of development. Secondary progressive MS (SPMS) is a type of disease resulting from transition of RRMS into progressive MS which has no obvious recurrence.

The experimental autoimmune encephalomyelitis (EAE) model is generally considered as an animal model related to MS (non-patent document 3). It has been reported that inducible T cell kinase (ITK) knockout mice showed reduction of disease severity in an experiment using EAE model mice (non-patent document 4). However, treatment of MS with a low molecular ITK inhibitor is not described.

Compound A, N-[2-(6,6-dimethyl-4,5,6,7-tetrahydro-1H-indazol-3-yl)-1H-indol-6-yl]-N-methyl-(2S)-2-(morpholin-4-yl)propanamide, and a pharmaceutically acceptable salt thereof are described in patent document 1 and patent document 2. Patent document 1 describes that Compound A has an ITK inhibitory activity and can be a medicament effective for the treatment or prophylaxis of diseases such as rheumatoid arthritis, inflammatory bowel disease and the like, suppression of rejection in transplantation, and the like. Patent document 2 describes the production methods of Compound A and a pharmaceutically acceptable salt thereof.

DOCUMENT LIST

Patent Documents patent document 1: WO 2011/065402
patent document 2: WO 2016/002918

Non-Patent Documents non-patent document 1: R G Richards, F C Sampson, S M Beard, P Tappenden. A review of the natural history and epidemiology of multiple sclerosis: implications for resource allocation and health economic models. Health Technology Assessment 2002; 6: 1-73.
non-patent document 2: Lublin F D, Reingold S C, Cohen J A, Cutter G R, Sorensen P S, Thompson A J, Defining the clinical course of multiple sclerosis: the 2013 revisions. Neurology. 2014 Jul. 15; 83(3):278-86.
non-patent document 3: Miller S D, Karpus W J, Davidson T S. Experimental autoimmune encephalomyelitis in the mouse. Current Protocols in Immunology 2010; Chapter 15: Unit 15.1.
non-patent document 4: Kannan, A. K., Kim, D. G., August, A., Bynoe, M. S. Itk signals promote neuroinflammation by regulating CD4+ T-cell activation and trafficking. Journal of Neuroscience, 2015; 35(1); 221-233.

SUMMARY OF INVENTION

Technical Problem

The problem to be solved by the present invention is provision of a therapeutic drug for MS.

Solution to Problem

The present inventors found in an experiment using a disease animal model of MS that Compound A and a salt thereof significantly reduce severity of the disease. Based on this finding, the present inventors have found that Compound A and a pharmaceutically acceptable salt thereof can be medicaments effective for MS, and further for MS for which the treatment effect of other therapeutic drugs for MS, for example, FTY-720, is insufficient, and completed the present invention.

That is, the present invention provides the following.
[1] A therapeutic agent or prophylactic agent for multiple sclerosis, comprising a compound represented by the following chemical structural formula:

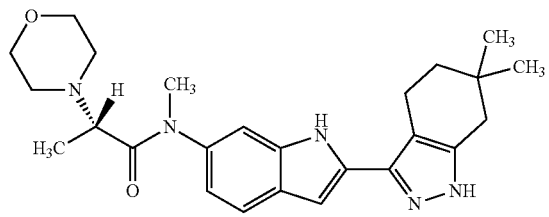 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof.

[2] The therapeutic agent or prophylactic agent of [1], wherein the multiple sclerosis is multiple sclerosis for which the treatment effect of other therapeutic drugs for multiple sclerosis is insufficient.
[3] The therapeutic agent or prophylactic agent of [2], wherein said other therapeutic drug for multiple sclerosis is FTY-720.
[4] The therapeutic agent or prophylactic agent of any of [1] to [3], wherein the multiple sclerosis is selected from the group consisting of relapsing-remitting multiple sclerosis, primary progressive multiple sclerosis, and secondary progressive multiple sclerosis.
[5] The therapeutic agent or prophylactic agent of any of [1] to [4], wherein the multiple sclerosis is at least one symptom of multiple sclerosis selected from the group consisting of feeling of weakness, ataxia, sensory neuropathy, dysuria, dyschezia, mental disorder and memory disorder.
[6] The therapeutic agent or prophylactic agent of any of [1] to [5], wherein the pharmaceutically acceptable salt is monohydrochloride.
[7] An agent for preventing the recurrence of multiple sclerosis, comprising a compound represented by the following chemical structural formula:

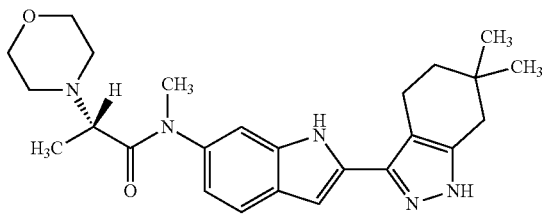 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof.
[8] The agent of [7], wherein the multiple sclerosis is multiple sclerosis for which the treatment effect of other therapeutic drug for multiple sclerosis is insufficient.
[9] The agent of [8], wherein said other therapeutic drug for multiple sclerosis is FTY-720.
[10] The agent of any of [7] to [10], wherein the pharmaceutically acceptable salt is monohydrochloride.
[11] An agent for suppressing the progression of a physical disorder of multiple sclerosis, comprising a compound represented by the following chemical structural formula:

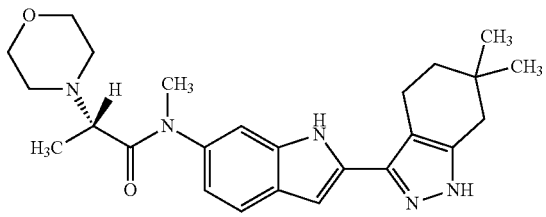 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof.
[12] The agent of [11], wherein the multiple sclerosis is multiple sclerosis for which the treatment effect of other therapeutic drug for multiple sclerosis is insufficient.
[13] The agent of [12], wherein said other therapeutic drug for multiple sclerosis is FTY-720.

[14] The agent of any of [11] to [13], wherein the pharmaceutically acceptable salt is monohydrochloride.
[15] A method for treating or preventing multiple sclerosis, comprising administering a therapeutically effective amount of a compound represented by the following chemical structural formula:

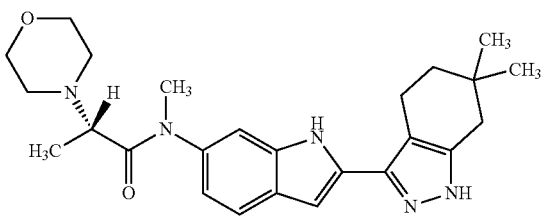 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof to a mammal.
[16] The method of [15], wherein the multiple sclerosis is multiple sclerosis for which the treatment effect of other therapeutic drug for multiple sclerosis is insufficient.
[17] The method of [16], wherein said other therapeutic drug for multiple sclerosis is FTY-720.
[18] The method of any of [15] to [17], wherein the multiple sclerosis is selected from the group consisting of relapsing-remitting multiple sclerosis, primary progressive multiple sclerosis, and secondary progressive multiple sclerosis.
[19] The method of any of [15] to [18], wherein the multiple sclerosis is at least one symptom of multiple sclerosis selected from the group consisting of feeling of weakness, ataxia, sensory neuropathy, dysuria, dyschezia, mental disorder and memory disorder.
[20] The method of any of [15] to [19], wherein the pharmaceutically acceptable salt is monohydrochloride.
[21] A method for preventing the recurrence of multiple sclerosis, comprising administering a therapeutically effective amount of a compound represented by the following chemical structural formula:

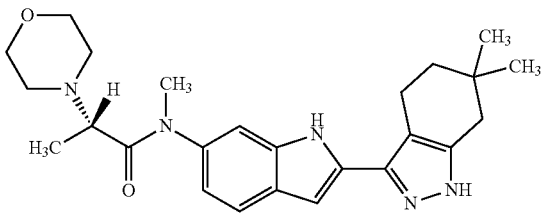 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof to a mammal.
[22] The method of [21], wherein the multiple sclerosis is multiple sclerosis for which the treatment effect of other therapeutic drug for multiple sclerosis is insufficient.
[23] The method of [22], wherein said other therapeutic drug for multiple sclerosis is FTY-720.
[24] The method of any of [21] to [23], wherein the pharmaceutically acceptable salt is monohydrochloride.
[25] A method for suppressing the progression of a physical disorder of multiple sclerosis, comprising administering a therapeutically effective amount of a compound represented by the following chemical structural formula:

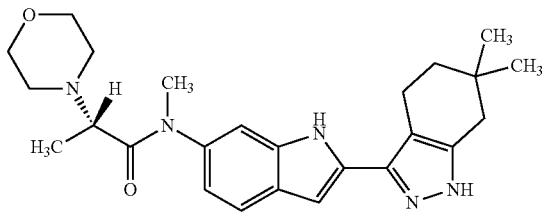 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof to a mammal.

[26] The method of [25], wherein the multiple sclerosis is multiple sclerosis for which the treatment effect of other therapeutic drug for multiple sclerosis is insufficient.

[27] The method of [26], wherein said other therapeutic drug for multiple sclerosis is FTY-720.

[28] The method of any of [25] to [27], wherein the pharmaceutically acceptable salt is monohydrochloride.

[29] A compound represented by the following chemical structural formula:

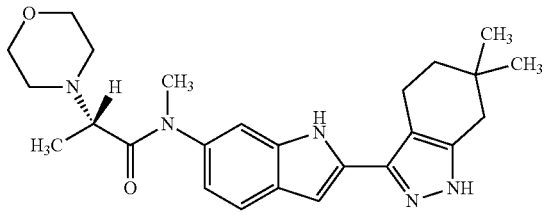 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof for use in treating or preventing multiple sclerosis.

[30] The compound or a pharmaceutically acceptable salt thereof of [29], wherein the multiple sclerosis is multiple sclerosis for which the treatment effect of other therapeutic drug for multiple sclerosis is insufficient.

[31] The compound or a pharmaceutically acceptable salt thereof of [30], wherein said other therapeutic drug for multiple sclerosis is FTY-720.

[32] The compound or a pharmaceutically acceptable salt thereof of any of [29] to [31], wherein the multiple sclerosis is selected from the group consisting of relapsing-remitting multiple sclerosis, primary progressive multiple sclerosis, and secondary progressive multiple sclerosis.

[33] The compound or a pharmaceutically acceptable salt thereof of any of [29] to [32], wherein the multiple sclerosis is at least one symptom of multiple sclerosis selected from the group consisting of feeling of weakness, ataxia, sensory neuropathy, dysuria, dyschezia, mental disorder and memory disorder.

[34] The compound or a pharmaceutically acceptable salt thereof of any of [29] to [33], wherein the pharmaceutically acceptable salt is monohydrochloride.

[35] A compound represented by the following chemical structural formula:

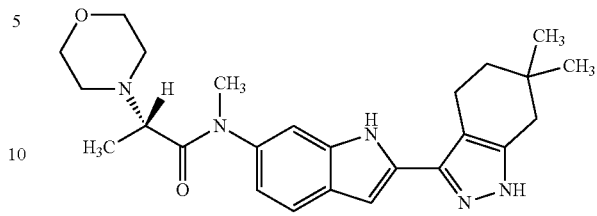

or a pharmaceutically acceptable salt thereof for use in preventing the recurrence of multiple sclerosis.

[36] The compound or a pharmaceutically acceptable salt thereof of [35], wherein the multiple sclerosis is multiple sclerosis for which the treatment effect of other therapeutic drug for multiple sclerosis is insufficient.

[37] The compound or a pharmaceutically acceptable salt thereof of [36], wherein said other therapeutic drug for multiple sclerosis is FTY-720.

[38] The compound or a pharmaceutically acceptable salt thereof of any of [35] to [37], wherein the pharmaceutically acceptable salt is monohydrochloride.

[39] A compound represented by the following chemical structural formula:

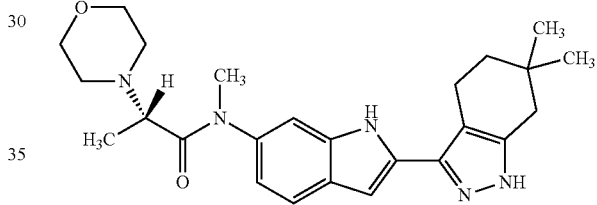

or a pharmaceutically acceptable salt thereof for use in suppressing the progression of a physical disorder of multiple sclerosis.

[40] The compound or a pharmaceutically acceptable salt thereof of [39], wherein the multiple sclerosis is multiple sclerosis for which the treatment effect of other therapeutic drug for multiple sclerosis is insufficient.

[41] The compound or a pharmaceutically acceptable salt thereof of [40], wherein said other therapeutic drug for multiple sclerosis is FTY-720.

[42] The compound or a pharmaceutically acceptable salt thereof of any of [39] to [41], wherein the pharmaceutically acceptable salt is monohydrochloride.

[43] Use of a compound represented by the following chemical structural formula:

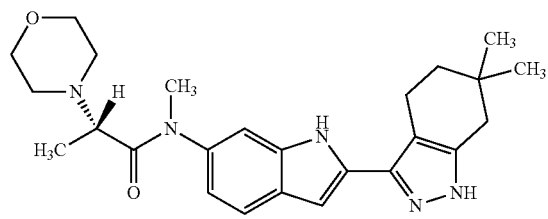 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof in producing a therapeutic agent or prophylactic agent for multiple sclerosis.

[44] The use of [43], wherein the multiple sclerosis is multiple sclerosis for which the treatment effect of other therapeutic drug for multiple sclerosis is insufficient.

[45] The use of [44], wherein said other therapeutic drug for multiple sclerosis is FTY-720.

[46] The use of any of [43] to [45], wherein the multiple sclerosis is selected from the group consisting of relapsing-remitting multiple sclerosis, primary progressive multiple sclerosis, and secondary progressive multiple sclerosis.

[47] The use of any of [43] to [46], wherein the multiple sclerosis is at least one symptom of multiple sclerosis selected from the group consisting of feeling of weakness, ataxia, sensory neuropathy, dysuria, dyschezia, mental disorder and memory disorder.

[48] The use of any of [43] to [47], wherein the pharmaceutically acceptable salt is monohydrochloride.

[49] Use of a compound represented by the following chemical structural formula:

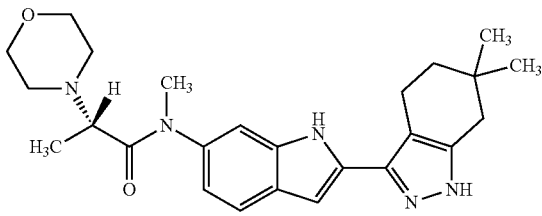 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof in producing an agent for preventing the recurrence of multiple sclerosis.

[50] The use of [49], wherein the multiple sclerosis is multiple sclerosis for which the treatment effect of other therapeutic drug for multiple sclerosis is insufficient.

[51] The use of [50], wherein said other therapeutic drug for multiple sclerosis is FTY-720.

[52] The use of any of [49] to [51], wherein the pharmaceutically acceptable salt is monohydrochloride.

[53] Use of a compound represented by the following chemical structural formula:

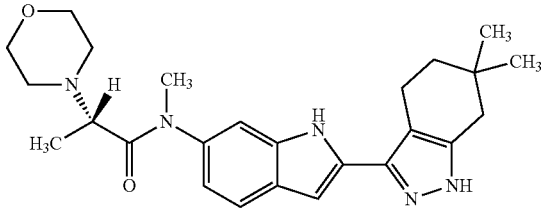 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof in producing an agent for suppressing the progression of a physical disorder of multiple sclerosis.

[54] The use of [53], wherein the multiple sclerosis is multiple sclerosis for which the treatment effect of other therapeutic drug for multiple sclerosis is insufficient.

[55] The use of [54], wherein said other therapeutic drug for multiple sclerosis is FTY-720.

[56] The use of any of [53] to [55], wherein the pharmaceutically acceptable salt is monohydrochloride.

ADVANTAGEOUS EFFECTS OF INVENTION

According to the present invention, Compound A is effective not only for the prophylaxis or treatment of MS, but also as an agent to be used for prolonging the period of remission or preventing recurrence of MS.

DESCRIPTION OF EMBODIMENTS

Figure 1:
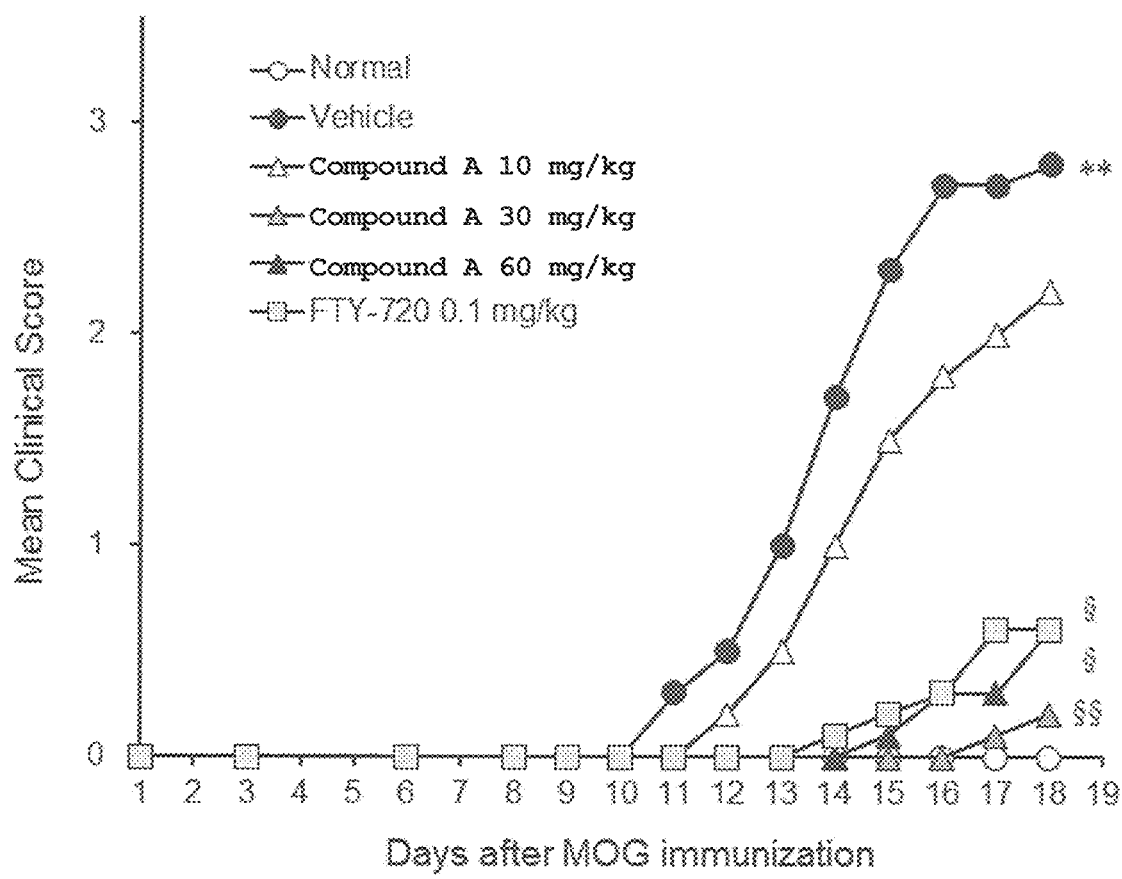
FIG. 1 shows the development of clinical scores in EAE model mice orally administered with the vehicle, monohydrochloride of Compound A or hydrochloride of FTY-720, and normal mice orally administered with the vehicle.

The definitions of the terms in this specification are as follows.

Compound A is N-[2-(6,6-dimethyl-4,5,6,7-tetrahydro-1H-indazol-3-yl)-1H-indol-6-yl]-N-methyl-(2S)-2-(morpholin-4-yl)propanamide, and is represented by the following chemical structural formula:

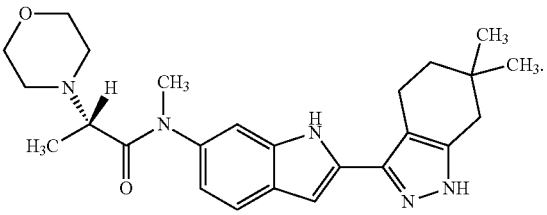

Any salt known in the technical field is acceptable as a "pharmaceutically acceptable salt" as long as it is not accompanied by excessive toxicity. Specifically, salts with inorganic acids, salts with organic acids, salts with inorganic bases, and salts with organic bases can be given as examples. Various forms of pharmaceutically acceptable salt are well known in the field and, for example, are described in the references below:

(a) Berge et al, J. Pharm. Sci., 66, p 1-19 (1977),
(b) Stahl et al, "Handbook of Pharmaceutical Salts: Properties, Selection, and Use" (Wiley-VCH, Weinheim, Germany, 2002), and
(c) Paulekuhn et al, J. Med. Chem., 50, p 6665-6672 (2007).

It is possible to obtain the respective pharmaceutically acceptable salts of Compound A by reacting Compound A with an inorganic acid, an organic acid, an inorganic base, or an organic base according to a method known per se. A pharmaceutically acceptable salt of Compound A may be formed as a half molecule, one molecule or two or more molecules of an acid or base with respect to one molecule of Compound A.

Salts with hydrofluoric acid, hydrochloric acid, hydrobromic acid, hydriodic acid, nitric acid, phosphoric acid, or sulfuric acid are given as examples of salts with inorganic acids.

Salts with acetic acid, adipic acid, alginic acid, 4-aminosalicylic acid, anhydromethylene citric acid, benzoic acid, benzenesulfonic acid, calcium edetate, camphoric acid, camphor-10-sulfonic acid, carbonic acid, citric acid, edetic acid, 1,2-ethanedisulfonic acid, dodecyl sulfate, ethane sulfonic acid, fumaric acid, glucoheptonic acid, gluconic acid, glucuronic acid, glycollylarsanilic acid, hexylresorcinic acid, hydroxy-naphthoic acid, 2-hydroxy-1-ethanesulfonic acid, lactic acid, lactobionic acid, malic acid, maleic acid, mandelic acid, methanesulfonic acid, methylsulfuric acid, methylnitric acid, methylenebis (salicylic acid), galactaric acid, naphthalene-2-sulfonic acid, 2-naphthoic acid, 1,5-naphthalenedisulfonic acid, oleic acid, oxalic acid, pamoic acid, pantothenic acid, pectic acid, picric acid, propionic acid, polygalacturonic acid, salicylic acid, stearic acid, succinic acid, tannic acid, tartaric acid, teoclic acid, thiocyanic acid, trifluoroacetic acid, p-toluenesulfonic acid, undecanoic acid, asparagine acid, or glutamic acid are given as examples of salts with organic acids.

Salts with lithium, sodium, potassium, magnesium, calcium, barium, aluminum, zinc, bismuth, or ammonium are given as examples of salts with inorganic bases.

Salts with arecoline, betaine, choline, clemizole, ethylenediamine, N-methylglucamine, N-benzylphenethylamine, tris(hydroxymethyl)methylamine, arginine, or lysine are given as examples of salts with organic bases.

Preferred embodiments of a "pharmaceutically acceptable salt" are as follows.

Salts with hydrochloric acid, nitric acid, sulfuric acid, phosphoric acid, or hydrobromic acid are given as examples of salts with inorganic acids.

Salts with oxalic acid, maleic acid, citric acid, fumaric acid, lactic acid, malic acid, succinic acid, tartaric acid, acetic acid, trifluoroacetic acid, benzoic acid, glucuronic acid, oleic acid, pamoic acid, methanesulfonic acid, benzenesulfonic acid, p-toluenesulfonic acid, or 2-hydroxy-1-ethanesulfonic acid are given as examples of salts with organic acids.

Salts with sodium, potassium, calcium, magnesium, or zinc are given as examples of salts with inorganic bases.

Salts with tris(hydroxymethyl)methylamine, N-methylglucamine, or lysine are given as examples of salts with organic bases.

A preferable pharmaceutically acceptable salt of Compound A among these is a monohydrochloride of Compound A represented by the following chemical structural formula:

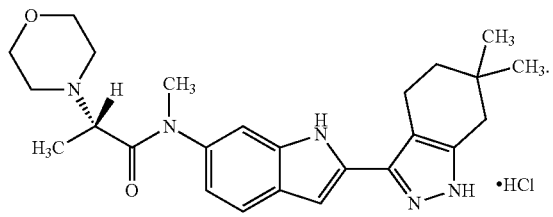 [SMILES: C[C@@H](C(=O)N(C)c1ccc2cc(-c3n[nH]c4c3CCC(C)(C)C4)[nH]c2c1)N1CCOCC1 ; Cl]

Compound A and the pharmaceutically acceptable salts thereof can be produced using a known method, a method described in patent document 1 or patent document 2, for example.

Compound A or the pharmaceutically acceptable salts thereof may exist as a solvate.

A "solvate" has a molecule of a solvent coordinated to Compound A or a pharmaceutically acceptable salt thereof, and this encompasses a hydrate. A pharmaceutically acceptable solvate is preferable as a solvate, and examples include a hydrate, an ethanol solvate, or a dimethyl sulfoxide solvate of Compound A or a pharmaceutically acceptable salt thereof.

Specifically, a hemihydrate, monohydrate, dihydrate, or mono(ethanol)solvate of Compound A, or a monohydrate of a sodium salt or a ⅔ (ethanol)solvate of a dihydrochloride of Compound A can be given as examples. These solvates can be obtained according to known methods.

Compound A or a pharmaceutically acceptable salt thereof, each of which has been substantially purified, is preferable as Compound A or a pharmaceutically acceptable salt thereof. More preferably, Compound A or a pharmaceutically acceptable salt thereof has been purified to a purity of at least 80%.

The therapeutic agent or prophylactic agent for multiple sclerosis of the present invention is produced, for example, according to a known method in the technical field of medicinal preparations by mixing Compound A or a pharmaceutically acceptable salt thereof with a suitable amount of at least one kind of pharmaceutically acceptable carrier or the like as appropriate. The amount of Compound A or a pharmaceutically acceptable salt thereof in said preparation differs according to the dosage form, dose, and the like, but is, for example, 0.1 to 100 wt % of the entire preparation.

The therapeutic agent or prophylactic agent of the present invention can be administered orally or parenterally. Oral administration or parenteral administration such as intravenous, intramuscular, subcutaneous, percutaneous, local, or rectal administration can be given as examples of dosage forms. Tablets, capsules, granules, powders, troches, syrups, emulsions, suspensions, and the like can be given as examples of dosage forms that are appropriate for oral administration, and external preparations, suppositories, injections, eye drops, eye ointments, patches, gels, implants, nasal preparations, or pulmonary preparations can be given as examples of dosage forms that are appropriate for parenteral administration. These can be prepared according to known methods in the technical field of medicinal preparations.

Examples of a "pharmaceutically acceptable carrier" include various organic or inorganic carrier substances conventionally used as formulation materials, and examples include excipients, disintegrants, binders, fluidizers, lubricants, and the like for solid preparations; solvents, solubilizing agents, suspending agents, isotonicity agents, buffering agents, soothing agents, and the like for liquid preparations; and bases, emulsifiers, humectants, stabilizers, stabilizing agents, dispersants, plasticizers, pH regulators, absorption promoters, gelling agents, antiseptics, fillers, solvents, solubilizing agents, suspending agents, and the like for semisolid preparations. It is also acceptable to use additives such as preservatives, antioxidants, colorants, sweetening agents, and the like as necessary.

Examples of the "excipient" include lactose, sucrose, D-mannitol, D-sorbitol, cornstarch, dextrin, microcrystalline cellulose, crystalline cellulose, carmellose, carmellose calcium, sodium carboxymethyl starch, low-substituted hydroxypropylcellulose, gum arabic and the like.

Examples of the "disintegrant" include carmellose, carmellose calcium, carmellose sodium, sodium carboxymethyl starch, croscarmellose sodium, crospovidone, low-substituted hydroxypropylcellulose, hydroxypropylmethylcellulose, crystalline cellulose and the like.

Examples of the "binder" include hydroxypropylcellulose, hydroxypropylmethylcellulose, povidone, crystalline cellulose, sucrose, dextrin, starch, gelatin, carmellose sodium, gum arabic and the like.

Examples of the "fluidizer" include light anhydrous silicic acid, magnesium stearate and the like.

Examples of the "lubricant" include magnesium stearate, calcium stearate, talc and the like.

Examples of the "solvent" include purified water, ethanol, propylene glycol, macrogol, sesame oil, corn oil, olive oil and the like.

Examples of the "solubilizing agent" include propylene glycol, D-mannitol, benzyl benzoate, ethanol, triethanolamine, sodium carbonate, sodium citrate and the like.

Examples of the "suspending agent" include benzalkonium chloride, carmellose, hydroxypropylcellulose, propylene glycol, povidone, methylcellulose, glycerol monostearate and the like.

Examples of the "isotonicity agent" include glucose, D-sorbitol, sodium chloride, D-mannitol and the like.

Examples of the "buffering agent" include sodium hydrogenphosphate, sodium acetate, sodium carbonate, sodium citrate and the like.

Examples of the "soothing agent" include benzyl alcohol and the like.

Examples of a "base" include water, animal and vegetable oils (olive oil, corn oil, peanut oil, sesame oil, castor oil, and the like), lower alcohols (ethanol, propanol, propylene glycol, 1,3-butylene glycol, phenol, and the like), higher fatty acids and esters thereof, waxes, higher alcohols, polyhydric alcohols, hydrocarbons (white petrolatum, liquid paraffin, paraffin, and the like), hydrophilic petrolatum, purified lanolin, absorptive ointments, hydrous lanolin, hydrophilic ointments, starches, pullulan, gum arabic, tragacanth gum, gelatins, dextran, cellulose derivatives (methyl cellulose, carboxymethyl cellulose, hydroxyethyl cellulose, hydroxypropyl cellulose, and the like), synthetic polymers (carboxyvinyl polymer, sodium polyacrylate, polyvinyl alcohol, polyvinyl pyrrolidone, and the like), propylene glycol, macrogol (Macrogol 200-600 and the like), and a combination of two or more kinds of these.

Examples of the "preservative" include ethyl paraoxybenzoate, chlorobutanol, benzyl alcohol, sodium dehydroacetate, sorbic acid and the like.

Examples of the "antioxidant" include sodium sulfite, ascorbic acid and the like.

Examples of the "colorant" include food colors (e.g., Food Color Red No. 2 or 3, Food Color Yellow No. 4 or 5 etc.), β-carotene and the like.

Examples of the "sweetening agent" include saccharin sodium, dipotassium glycyrrhizinate, aspartame and the like.

The dose of therapeutic agent or prophylactic agent of the present invention in mammal inclusive of human (e.g., human, mouse, rat, hamster, guinea pig, rabbit, cat, dog, swine, bovine, horse, sheep, monkey etc.) varies depending on the subject of administration, disease, symptom, dosage form, administration route and the like. For example, the daily dose for oral administration to a human adult patient (body weight: about 60 kg) is generally 0.1 mg-1 g, preferably 10 mg-800 mg, more preferably 30-300 mg, particularly preferably 50-200 mg, when calculated using Compound A as the active ingredient, and this amount can be administered in one to several portions per day either before a meal, after a meal, or during a meal. The duration of administration is not particularly limited.

Compound A or a pharmaceutically acceptable salt thereof can be used as an active ingredient of a therapeutic agent or prophylactic agent for multiple sclerosis.

In the present specification, the "treatment" also includes improvement of symptoms, and prevention or delay of aggravation.

In the present specification, the "prophylaxis" means suppression of the onset of symptoms.

In the present invention, multiple sclerosis may be multiple sclerosis for which the treatment effect of other therapeutic drugs for multiple sclerosis is insufficient.

Examples of other therapeutic drug for multiple sclerosis include FTY-720, dimethyl fumarate, teriflunomide, glatiramer, interferon α-n1, interferon β, interferon β-1a, interferon β-1b, anti-VLA-4 antibody, anti-CD52 antibody, anti-CD20 antibody, monomethyl fumarate, cladribine, adrenocorticotropic hormone, nabiximorus, fampridine, dextromethorphan, diroximel, amantadine, Siponimod, ponesimod, ozanimod, biotin, masitinib, mitoxantrone and the like, preferably FTY-720. FTY-720 is 2-amino-2-[2-(4-octyl-phenyl)-ethyl]-propane-1,3-diol, and is also known as fingolimod.

The insufficient treatment effect means that the effect of improving the symptoms of multiple sclerosis, or preventing or delaying aggravation thereof is clinically insufficient. It preferably means that the effect of improving the symptoms of the feeling of weakness or ataxia (physical disorder) in multiple sclerosis, or preventing or delaying aggravation thereof is not clinically sufficient.

Compound A or a pharmaceutically acceptable salt thereof can be used as the active ingredient of an agent for suppressing the progression of a physical disorder of multiple sclerosis, an agent for maintaining the remission of multiple sclerosis (remission maintaining agent) or a recurrence preventing agent.

The agent for suppressing the progression of a physical disorder of multiple sclerosis means an agent for discontinuing or delaying the progression of a physical disorder such as ataxia or the like.

The agent for maintaining the remission means an agent for prolonging the period showing improvement of symptoms.

The recurrence preventing agent means an agent for suppressing the onset of symptoms after remission.

In addition, multiple sclerosis is classified into relapsing-remitting type, primary progressive type, secondary progressive type, and progressive recurrent type according to the pattern of progression. Compound A or a pharmaceutically acceptable salt thereof can be used as the active ingredient of any type of therapeutic agent or prophylactic agent for multiple sclerosis.

Furthermore, the symptoms of multiple sclerosis include feeling of weakness, ataxia (physical disorder), sensory neuropathy, urination and defecation disorders, mental and memory disorders and the like. Among these, Compound A or a pharmaceutically acceptable salt thereof is preferably used for feeling of weakness or ataxia (physical disorder).

The therapeutic agent or prophylactic agent of the present invention can be used in combination with one or a plurality of other medicaments (hereinafter to be also referred to as a concomitant drug) according to a method generally employed in the medical field (hereinafter to be referred to as combination use).

The timing of administration of a drug containing Compound A or a pharmaceutically acceptable salt thereof and a concomitant drug is not limited. It is acceptable to administer these to an administration subject as a combination drug, and it is also acceptable to administer the two formulations either simultaneously or at a fixed interval. Furthermore, it is also acceptable to use the therapeutic agent or prophylactic agent of the present invention and a concomitant drug as a medication that is characterized in that the medication is a kit containing the agent and a concomitant drug. The dosage of a concomitant drug is acceptable as long as it is based on a dosage used in clinical practice, and the dosage can be appropriately selected according to the administration subject, disease, symptoms, dosage form, administration route, administration time, combination, and so on. The dosage form of a concomitant drug is not particularly limited, and is acceptable as long as a drug containing Compound A or a pharmaceutically acceptable salt thereof is combined with the concomitant drug. Examples of the concomitant drug include other therapeutic drugs for MS, for example, FTY-720, dimethyl fumarate, teriflunomide, glatiramer, interferon α-n1, interferon β, interferon β-1a, interferon β-1b, anti-VLA-4 antibody, anti-CD52 antibody, anti-CD20 antibody, monomethyl fumarate, cladribine, adrenocorticotropic hormone, nabiximorus, fampridine, dextromethorphan, diroximel, amantadine, siponimod, ponesimod, ozanimod, biotin, masitinib, mitoxantrone and the like.

One embodiment of the present invention provides a method for treating or preventing multiple sclerosis, a method for preventing the recurrence of, a method for maintaining the remission of, and a method for suppressing the progression of a physical disorder of multiple sclerosis, each of which includes administering a therapeutically effective amount of Compound A or a pharmaceutically acceptable salt thereof to a mammal. Definitions and the like are as described above.

In this specification, an "effective amount" means, for example, the amount of a medication or drug that elicits a biological or medical response in a tissue, system, animal or human. Furthermore, a "therapeutically effective amount" means an arbitrary amount that either provides a treatment, cure, prophylaxis, or improvement where disease, disorder or side effect is improved or the rate of progression of disease is decreased, in comparison with a corresponding subject that has not received such an amount.

One embodiment of the present invention provides a pharmaceutical composition for treating or preventing multiple sclerosis, a pharmaceutical composition for preventing the recurrence of multiple sclerosis, a pharmaceutical composition for maintaining the remission of multiple sclerosis or a pharmaceutical composition for suppressing the progression of a physical disorder of multiple sclerosis, each of which contains Compound A or a pharmaceutically acceptable salt thereof. Definitions and the like are as described above.

One embodiment of the present invention provides use of Compound A or a pharmaceutically acceptable salt thereof in producing a therapeutic agent or prophylactic agent for multiple sclerosis, a recurrence preventing agent for multiple sclerosis, an agent for maintaining the remission of multiple sclerosis, and an agent for suppressing the progression of a physical disorder of multiple sclerosis. Definitions and the like are as described above.

One embodiment of the present invention provides Compound A or a pharmaceutically acceptable salt thereof for use in treating or preventing multiple sclerosis, preventing the recurrence of multiple sclerosis, maintaining the remission of multiple sclerosis, or suppressing the progression of a physical disorder of multiple sclerosis. Definitions and the like are as described above.

EXAMPLE

The present invention will be explained below in detail using examples of embodiment, but the present invention is not limited by these examples of embodiment.

Formulation examples of the present invention include the following formulations. The present invention is not, however, limited by these formulation examples.

Formulation Example 1: Production of Capsule 1) monohydrochloride of Compound A 30 mg
2) Microcrystalline cellulose 10 mg
3) lactose 19 mg
4) magnesium stearate 1 mg
1), 2), 3) and 4) are mixed and filled in a gelatin capsule.

Formulation Example 2: Production of Tablet 1) monohydrochloride of Compound A 10 g
2) lactose 50 g
3) cornstarch 15 g
4) carmellose calcium 44 g
5) magnesium stearate 1 g The entire amounts of 1), 2) and 3) and 30 g of 4) are kneaded with water, vacuum dried and sieved. The sieved powder is mixed with 14 g of 4) and 1 g of 5), and the mixture is tableted by a tableting machine. In this way, 1000 tablets each containing 10 mg of the monohydrochloride of Compound A per tablet are obtained.

Experimental Example 1: Suppressive Effect of Oral Administration of Compound A on an Increase in Clinical Score in Mouse Experimental Autoimmune Encephalomyelitis (EAE) Model Using a mouse EAE model, the suppressive effect of Compound A on an increase in clinical score was evaluated. The evaluation was performed by reference to non-patent document 3. As the experiment animal, 8-week-old female C57BL/6J mouse (CHARLES RIVER LABORATORIES JAPAN, INC.) was used. Monohydrochloride of Compound A was dissolved in 0.5% (w/v) methylcellulose (MC) to prepare 1 mg/mL, 3 mg/mL and 6 mg/mL Compound A solutions. FTY-720 hydrochloride (Cayman Chemical) was dissolved in 0.5% (w/v) MC to prepare a 0.01 mg/mL FTY-720 solution.

An emulsion of 1.5 mg/mL myelin oligodendrocyte glycoprotein peptide (MOG; ANASPEC) and 2 mg/mL freund complete adjuvant (CFA; Chondrex) mixed in equal ratio was subcutaneously administered to all groups except a normal group on both sides of abdomen at a volume of 100 μL/head (day 1). 1 μg/mL pertussis toxin (PTX; List Biological Laboratories) was intraperitoneally administered at a volume of 200 μL/head (days 1 and 3). Then, 0.5% (w/v) methylcellulose (MC) was orally administered to a normal group and a vehicle group, 1 mg/mL, 3 mg/mL or 6 mg/mL Compound A solution was orally administered to Compound A administration group, and 0.01 mg/mL FTY-720 solution was orally administered to FTY-720 administration group, each at a volume of 10 mL/kg once per day for 17 days (days 1-17) from the date of administration of the emulsion.

As clinical scores (score 0; normal, score 1; limp tail, score 2; hind limb weakness, score 3; partial hind limb paralysis, score 4; complete hind limb paralysis, score 5; moribund state, dead), the condition was observed over time and scored for each individual for 18 days from day 1.

Average clinical score was calculated for each group and the results thereof are shown in FIG. 1.

Experimental Example 2: Suppressive Effect of Oral Administration of Compound A on an Increase in Clinical Score in Mouse Adoptive Transfer EAE Model Using a mouse Adoptive transfer EAE model, the suppressive effect of Compound A on an increase in clinical score was evaluated. The evaluation was performed by reference to non-patent document 3. As the experiment animal, 8-week-old female C57BL/6J mouse (CHARLES RIVER LABORATORIES JAPAN, INC.) was used. Monohydrochloride of Compound A was dissolved in 0.5% (w/v) methylcellulose (MC) to prepare a 6 mg/mL Compound A solution. FTY-720 hydrochloride (Cayman Chemical) was dissolved in 0.5% (w/v) MC to prepare a 0.01 mg/mL FTY-720 solution.

An emulsion of 1.5 mg/mL MOG and 2 mg/mL CFA mixed in equal ratio was subcutaneously administered to the experiment animal on both sides of abdomen at a volume of 100 μL/head. Then, 1 μg/mL PTX was intraperitoneally administered at a volume of 200 μL/head (immediately after subcutaneous administration and 2 days later). Spleen was collected from the experimental animal and spleen cells were obtained (7 days after subcutaneous administration). The spleen cells were cultured for 2 days in a culture medium containing 10 ng/mL recombinant IL-23 (R & D System) and 5 mg/mL MOG (7 to 9 days after subcutaneous administration). A cell suspension prepared at $6 \times 10^7$ cells/mL was intraperitoneally administered to all groups at a volume of 500 μL/head (day 1). Then, 0.5% (w/v) MC was orally administered to a vehicle group, 6 mg/mL Compound A solution was orally administered to Compound A administration group, and 0.01 mg/mL FTY-720 solution was orally administered to FTY-720 administration group, each at a volume of 10 mL/kg once per day for 19 days (days 1-19) from the date of administration of the cell suspension.

Figure 2:
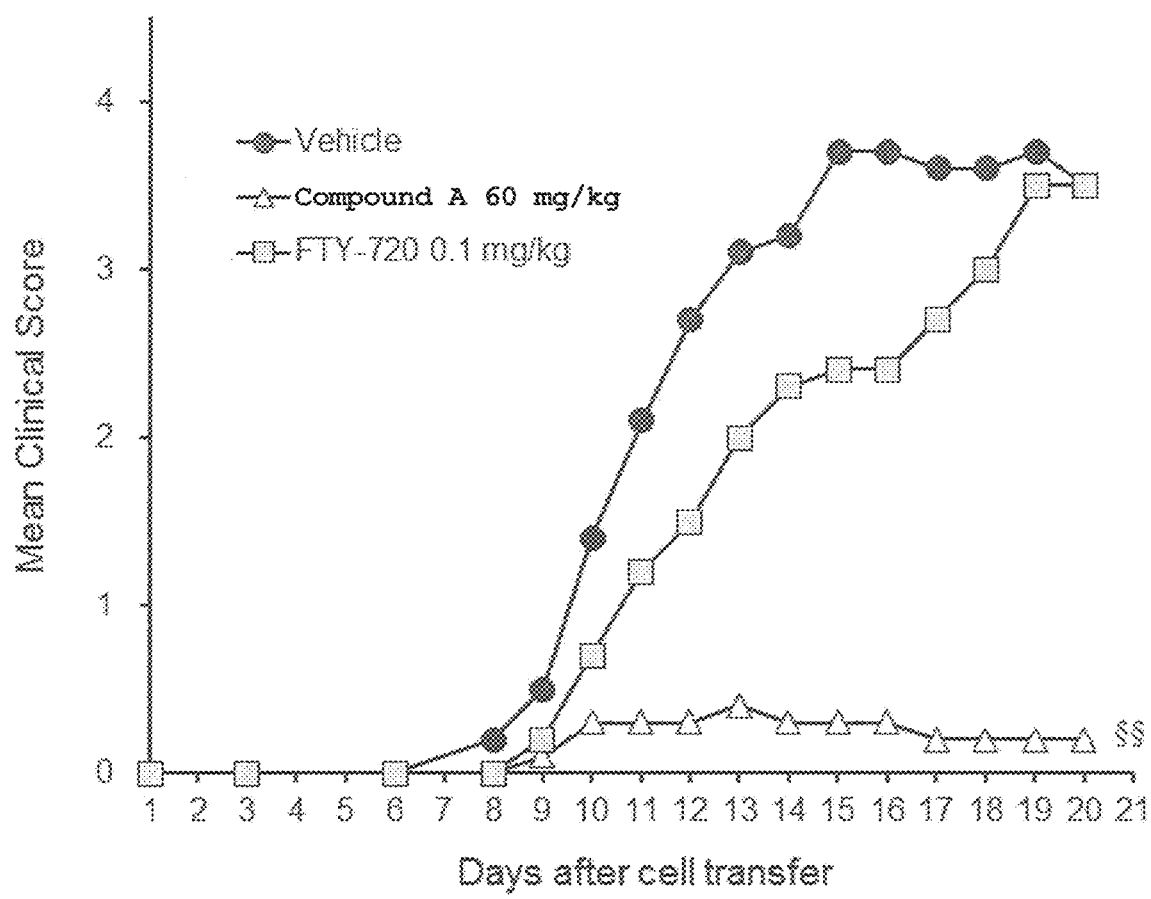
FIG. 2 shows the development of clinical scores in Adoptive transfer EAE model mice orally administered with the vehicle, monohydrochloride of Compound A or hydrochloride of FTY-720, and normal mice orally administered with the vehicle.

As clinical scores (score 0; normal, score 1; limp tail, score 2; hind limb weakness, score 3; partial hind limb paralysis, score 4; complete hind limb paralysis, score 5; moribund state, dead), the condition was observed over time and scored for each individual for 20 days from day 1. Average clinical score was calculated for each group and the results thereof are shown in FIG. 2.

INDUSTRIAL APPLICABILITY

The present invention provides a novel pharmaceutical use of Compound A or a pharmaceutically acceptable salt thereof wherein the target disease is multiple sclerosis.

The invention claimed is:

1. A method for treating multiple sclerosis in a human subject in need thereof, comprising administering to the human subject a therapeutically effective amount of a compound represented by the following chemical structural formula:

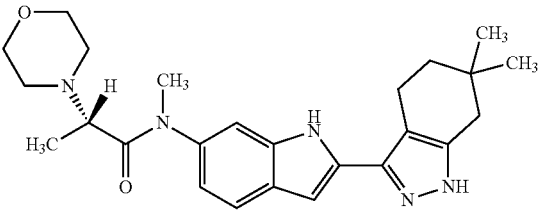 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof, wherein the human subject has had a prior treatment with FTY-720, and wherein the prior treatment with FTY-720 is clinically insufficient.

2. The method according to claim 1, wherein the multiple sclerosis is selected from the group consisting of relapsing-remitting multiple sclerosis, primary progressive multiple sclerosis, and secondary progressive multiple sclerosis.

3. The method according to claim 1, wherein the human subject has at least one symptom of multiple sclerosis selected from the group consisting of feeling of weakness, ataxia, sensory neuropathy, dysuria, dyschezia, mental disorder and memory disorder.

4. The method according to claim 1, wherein the pharmaceutically acceptable salt is monohydrochloride.

5. A method for suppressing the progression of a physical disorder of multiple sclerosis in a human subject in need thereof, comprising administering to the human subject a therapeutically effective amount of a compound represented by the following chemical structural formula:

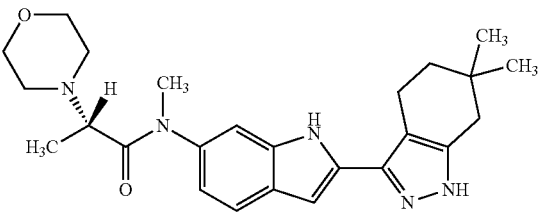 [SMILES: C[C@@H](C(=O)N(C)c1ccc2cc(-c3n[nH]c4c3CCC(C)(C)C4)[nH]c2c1)N1CCOCC1]

or a pharmaceutically acceptable salt thereof, wherein the human subject has had a prior treatment with FTY-720, and wherein the prior treatment with FTY-720 is clinically insufficient.

6. The method according to claim 5, wherein the pharmaceutically acceptable salt is monohydrochloride.

* * * * *